(12) United States Patent
Gengler et al.

(10) Patent No.: US 6,317,676 B1
(45) Date of Patent: Nov. 13, 2001

(54) METHOD AND APPARATUS FOR CONTROLLING SLIP

(75) Inventors: Eric P. Gengler; Jeffrey M. Thate, both of Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/589,505

(22) Filed: Jun. 7, 2000

(51) Int. Cl.$^7$ .................................. G06F 7/00; E02F 3/76
(52) U.S. Cl. .................................. 701/82; 701/50; 172/2; 172/4.5
(58) Field of Search .................. 701/82, 50; 172/2, 172/4, 4.5; 180/9.4; 37/399

(56) References Cited

U.S. PATENT DOCUMENTS

| | | | |
|---|---|---|---|
| 4,508,176 | 4/1985 | Wiegardt et al. | 172/7 |
| 4,518,044 | 5/1985 | Wiegardt et al. | 172/7 |
| 4,979,092 | 12/1990 | Bergene et al. | 364/148 |
| 5,082,081 | 1/1992 | Tsuyama et al. | 180/197 |
| 5,143,159 | 9/1992 | Young et al. | 172/8 |
| 5,190,111 | 3/1993 | Young et al. | 172/7 |
| 5,320,186 | 6/1994 | Strosser et al. | 172/8 |
| 5,443,307 | 8/1995 | Maier | 303/169 |
| 5,469,694 | 11/1995 | Panousheck et al. | 56/10.2 |
| 5,504,680 | 4/1996 | Yamashita et al. | 364/426.03 |
| 5,549,166 | 8/1996 | Orbach et al. | 172/4 |
| 5,621,643 | 4/1997 | Nakagami et al. | 364/424.07 |
| 5,684,691 | 11/1997 | Orbach et al. | 364/167.01 |
| 5,755,291 | 5/1998 | Orbach et al. | 172/2 |
| 5,765,657 | 6/1998 | Fukumura et al. | 180/197 |
| 5,810,095 | 9/1998 | Orbach et al. | 172/2 |
| 5,884,204 | 3/1999 | Orbach et al. | 701/50 |
| 5,899,279 | 5/1999 | Bennett et al. | 172/7 |
| 5,911,769 | 6/1999 | Orbach et al. | 701/50 |
| 5,918,195 | 6/1999 | Halgrimson et al. | 702/94 |
| 6,039,141 | * 3/2000 | Denny | 180/329 |
| 6,119,786 | * 9/2000 | Creger et al. | 172/7 |
| 6,144,910 | * 11/2000 | Scarlett et al. | 701/50 |

* cited by examiner

*Primary Examiner*—Yonel Beaulieu
(74) *Attorney, Agent, or Firm*—Clifton G. Green

(57) ABSTRACT

Apparatuses and methods for controlling the slip of a work machine having a ground-engaging traction device and a hitch operable to receive a ground-engaging implement. A control system receives an actual velocity signal indicative of an actual velocity of the work machine, an apparent velocity signal indicative of an apparent velocity of the work machine, and a desired slip signal indicative of a desired slip of the work machine. The control system determines an actual derivative of slip of the work machine as a function of the actual velocity signal and the apparent velocity signal, and transmits a control signal as a function of the desired slip signal, the actual velocity signal, the apparent velocity signal, and the actual derivative of the slip. The control signal controls the vertical position of one of the hitch and the ground-engaging implement.

15 Claims, 2 Drawing Sheets

METHOD AND APPARATUS FOR CONTROLLING SLIP

TECHNICAL FIELD

This invention relates generally to controlling the operating characteristics of a mobile work machine, and more particularly, to controlling the slip of a mobile work machine having a ground-engaging work implement.

BACKGROUND ART

Wheel or track slippage, i.e., slip, poses a problem for many work machines, such as tractors. A certain amount of slip may be desired for efficient operation in the field, however excessive slip may cause burrowing into the field or even cause the tractor to become stuck.

To control slip, one technique regulates the position of a plow or other tool pulled by the tractor. The plow is raised when an excessive slip is detected, and lowered if more slip is desired. By raising the plow, the amount of drag or draft of the tractor is reduced, thereby causing a reduction in slip, and by lowering the plow it is increased, thereby typically causing an increase in slip.

While considerable variation exists for conventional control schemes for slip, they typically compare the actual slip of the tractor with the desired slip. In general, an error signal equal to the difference between the two is then used as an input to an actuator which raises the plow when the desired slip is greater than the actual slip and lowers the plow when the reverse is true.

Although this technique works, it suffers stability problems because it only reacts after a particular error condition has been sensed (the slip being greater or less than desired). This technique is not able to predictively modify the characteristics of the control algorithm.

DISCLOSURE OF THE INVENTION

The present invention provides apparatus and methods for controlling the slip of a work machine having a ground-engaging traction device and a hitch operable to receive a ground-engaging implement. A control system receives an actual velocity signal indicative of an actual velocity of the work machine, an apparent velocity signal indicative of an apparent velocity of the work machine, and a desired slip signal indicative of a desired slip of the work machine. The control system determines an actual derivative of slip of the work machine as a function of the actual velocity signal and the apparent velocity signal, and transmits a control signal as a function of the desired slip signal, the actual velocity signal, the apparent velocity signal, and the actual derivative of the slip. The control signal controls the vertical position of one of the hitch and the ground-engaging implement.

BEST MODE FOR CARRYING OUT THE INVENTION

Figure 1:
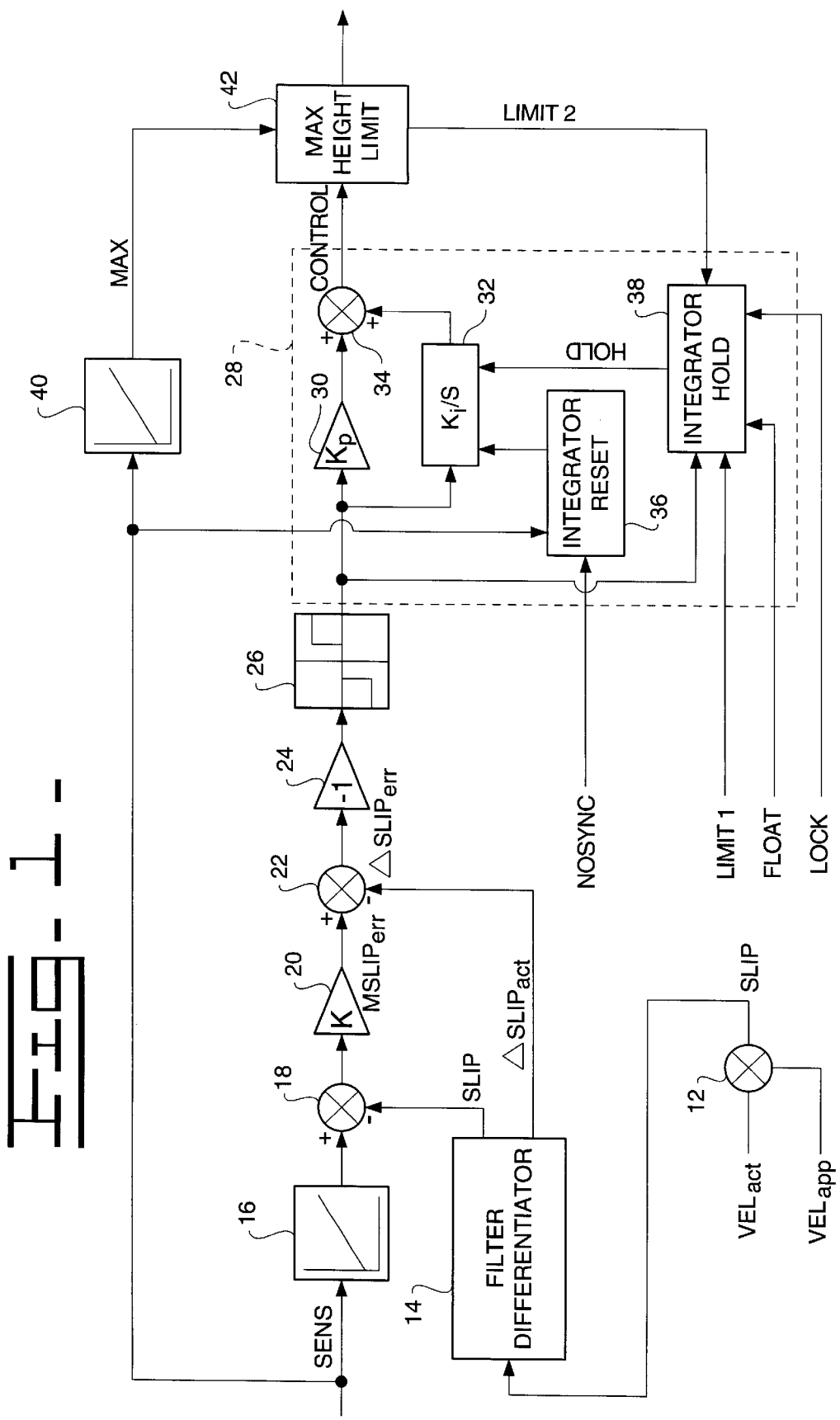
FIG. 1 is a functional block diagram of a slip control system according to one embodiment of the invention.

FIG. 1 is a functional block diagram of a slip control system 10 according to one embodiment of the invention. The slip control system 10 includes a first processing device, such as a first summer 12, which receives an actual velocity signal ("$VEL_{act}$") and an apparent velocity signal ("$VEL_{app}$") of a mobile work machine (not shown). The actual velocity signal $VEL_{act}$ corresponds to the true ground speed of the work machine.

The true ground speed may be determined by a variety of ways known to those skilled in the art. For example, a ground speed sensor (not shown) having a radar may be used. The sensor emits radar signals towards the ground and receives reflected radar signals that are then used to determine the true ground speed of the work machine. A laser may also be used in a similar manner. A non-driven ground-engaging traction device, such as a wheel or track, could also be used to sense ground speed. Finally, a global positioning sensor ("GPS") could be used to determine ground speed by measuring the change in position over a given period of time.

The apparent velocity signal $VEL_{app}$ corresponds to a velocity of a ground-engaging traction device, such as a wheel or track (not shown). The apparent velocity signal $VEL_{app}$ is a function of the radius/diameter of the drive mechanism/driving member, such as the wheel itself or a drive gear in the case of some tracks, and the rotational velocity of the drive mechanism. In simple terms, the apparent velocity is typically the velocity that an operator would read on a speedometer on the work machine.

The first summer 12 determines the difference between the actual velocity signal $VEL_{act}$ and the apparent velocity signal $VEL_{app}$, and transmits an actual slip signal ("SLIP") corresponding to this value. This value is the actual slip of the work machine. Although FIG. 1 indicates the apparent velocity signal $VEL_{app}$ is subtracted from the actual velocity signal $VEL_{act}$, the reverse could also be done.

One problem with calculating the actual slip signal SLIP as described above is that as the actual velocity of the work machine reaches a large number, even small percentage differences between the apparent velocity and the actual velocity may cause a large actual slip signal SLIP to be transmitted. In another embodiment of the invention, a slip percentage is used as the slip signal SLIP instead. For example, instead of using summer 12 to output the difference between the actual and apparent velocities, the summer 12 could output the actual slip signal SLIP equal to a slip percentage, such as: 1−(apparent velocity/actual velocity)*100. Other formulae may also be used, as appropriate. This type of formula would then generally avoid the situation described above.

A filter, such as a differentiator 14, is coupled with the first summer 12 to receive the actual slip signal SLIP. The differentiator 14 determines a derivative of the slip signal, such as the rate of change of the slip over predetermined period of time. The differentiator 14 may accomplish this through a variety of ways known to those skilled in the art. The differentiator 14 transmits an actual slip derivative signal ("$\Delta SLIP_{act}$") corresponding to the determined derivative of the slip signal SLIP. In one embodiment, the differentiator 14 may also transmit the actual slip signal SLIP.

In one embodiment, an operator (not shown) sets a slip sensitivity of a desired slip transmitter (not shown). The desired slip transmitter may be any of a variety of appropriate input devices known to those skilled in the art. For example, a switch or dial could be used. The desired slip transmitter transmits a slip sensitivity signal SENS corresponding to the slip sensitivity, e.g., the amount of desired slip. In another embodiment, the slip sensitivity signal SENS may be fixed, e.g., hardwired or otherwise set to a predetermined value. In appropriate embodiments, the slip sensitivity transmitter may be integrated into the slip control system 10 by ways known to those skilled in the art.

A desired slip map 16 typically receives the slip sensitivity signal SENS and transmits a desired slip signal $SLIP_{des}$ as a function of the slip sensitivity signal SENS and a predetermined map. The predetermined map may be any of a variety of appropriate maps, including linear and nonlinear maps.

A second summer 18 is coupled with the slip map 16 to receive the desired slip signal $SLIP_{des}$ and with the differentiator 14 to receive the actual slip signal SLIP. The second summer 18 determines the difference between the desired slip and the actual slip, and transmits a slip error signal $SLIP_{err}$ as a function thereof. In other embodiments, the second summer 18 may be coupled directly with the input device to receive the slip sensitivity signal SENS, and/or with the first summer 12 to receive the actual slip signal SLIP. Although FIG. 1 shows the actual slip signal SLIP being subtracted from the desired slip signal $SLIP_{des}$, the reverse could also be done.

A first signal multiplier 20 is typically coupled with the second summer 18 to receive the slip error signal $SLIP_{err}$. The first signal multiplier 20 multiplies the slip error signal $SLIP_{err}$ by a predetermined gain, and transmits a multiplied slip error signal $MSLIP_{err}$ as a function thereof. As will be evident below, the units for the gain are typically chosen to be "per second". Thus, the multiplied slip error signal $MSLIP_{err}$ will be in units of slip error per second. Other units for the gain may also be used as appropriate.

A third summer 22 is coupled with the first signal multiplier 20 to receive the multiplied slip error signal $MSLIP_{err}$ and coupled with the differentiator 14 to receive the actual slip derivative signal $\Delta SLIP_{act}$. The third summer 22 determines the difference between the multiplied slip error signal $MSLIP_{err}$, and the actual slip derivative signal $\Delta SLIP_{act}$, and transmits a derivative slip error signal $\Delta SLIP_{err}$ as a function thereof. Although FIG. 1 shows the third summer 22 subtracting the actual slip derivative signal $\Delta SLIP_{act}$ from the multiplied slip error signal $MSLIP_{err}$, the reverse could also be done.

In another embodiment, the third summer 22 may be directly coupled with the output of the second summer 18. This is equivalent to having a gain of one in the first signal multiplier 20.

A second signal multiplier 24 is typically coupled with the third summer 22 to receive the derivative slip error signal $\Delta SLIP_{err}$. The second signal multiplier 24 multiplies the derivative slip error signal $\Delta SLIP_{err}$ by a second predetermined gain, and transmits a multiplied derivative slip error signal $M\Delta SLIP_{err}$ as a function thereof. In the embodiment shown in FIG. 1, the second predetermined gain is negative one. Other gains may be chosen as appropriate, but in the embodiment shown, a gain of negative one causes a hitch (described below) to lower when the derivative slip error is positive (i.e., generally when the actual slip is less than the desired slip), and to raise when the derivative slip error is negative (i.e., generally when the actual slip is greater than the desired slip). Similarly, in one embodiment, the second signal multiplier 24 may be omitted where no gain is desired.

A deadband filter 26 is typically coupled with the second signal multiplier 24 to receive the multiplied derivative slip error signal $M\Delta SLIP_{err}$. The deadband filter 26 filters the multiplied derivative slip error signal $M\Delta SLIP_{err}$, transmitting the multiplied derivative slip error signal only when the multiplied derivative slip error signal $M\Delta SLIP_{err}$ has a magnitude greater than a predetermined value. If the multiplied derivative slip error signal $M\Delta SLIP_{err}$ is less than the predetermined value, the deadband filter 26 transmits a signal having a value of zero. The deadband filter 26 functions by ways known to those skilled in the art, typically filtering in both the positive and negative spectrums, e.g., transmitting the multiplied derivative slip error signal $M\Delta SLIP_{err}$ when it is greater than five or less than negative five. Other values may also be chosen as appropriate.

A controller 28 is coupled with the deadband filter 26 to receive the signal transmitted from the deadband filter 26. The controller 28 transmits a control signal CONTROL as a function of the signal received from the deadband filter. In one embodiment, the controller 28 is a proportional plus integral controller, although any of a variety of appropriate controllers known to those skilled in the art may also be used. For example, and not by way of limitation, a proportional controller, a proportional plus integral plus derivative controller, or a proportional plus feed forward controller may be used in appropriate embodiments of the invention. The control signal CONTROL may be any of a variety of signals known to those skilled in the art. For example, the control signal CONTROL may be a current signal, a voltage signal, or a pulse width modulated signal. The control signal CONTROL may be used as a relative position command, causing a change in position proportional to the control signal CONTROL, as a velocity signal, causing movement in a particular direction at a velocity proportional to the control signal CONTROL, or in a variety of other ways known to those skilled in the art.

The controller includes a proportional multiplier 30, an integrator multiplier 32, and a fourth summer 34, each of which function according to ways known to those skilled in the art. The gains of the proportional and integrator multipliers 30, 32 may be chosen by any of a variety of ways known to those skilled in the art.

The controller 28 also typically includes an integrator reset 36. The integrator reset 36 receives an out-of-synch signal NOSYNC when the work implement is not "captured". The work implement is generally considered to be not captured when the work implement is in a different position than is expected, e.g., different from the position set in the cab by a hitch position lever. If the work implement is not captured, the integrator reset 36 resets or nulls the integral term 32 of the controller 28. This prevents sudden movements of the work implement when the slip control system 10 becomes active due to a residual value left on the integrator multiplier 32.

Finally, in one embodiment, the integrator reset 36 also receives the slip sensitivity signal SENS. In certain embodiments, the slip sensitivity signal SENS may indicate whether the slip control system 10 is active, e.g., being zero when the slip control system 10 is to be inactive. It may then be desirable to reset the integrator 32 for reasons similar to what is described above.

In one embodiment, the controller 28 also typically includes an integrator hold 38. The integrator hold 38 typically receives several flag signals that cause the integrator hold 38 to transmit a hold signal HOLD to the integrator multiplier 32. When the integrator multiplier 32 receives the hold signal HOLD, the integrator multiplier 32 typically holds its current value, and transmits that value as the output of the integrator multiplier 32.

In appropriate embodiments, the integrator multiplier 32 may be allowed to integrate in one direction, either up or down, upon receiving the hold signal, but would not be allowed to integrate in the other direction. In one embodiment, the integrator multiplier 32 may receive multiple types of hold signals, with, for example, one type of hold signal preventing the integrator multiplier 32 from integrating up and one for preventing the integrator multiplier 32 from integrating down.

The integrator hold 38 may transmit the hold signal HOLD, for example, upon receiving a first maximum height limit signal LIMIT1. The first maximum height limit signal LIMIT1 is generally a flag signal indicative of the hitch position being at its maximum height. The integrator hold 38 may also transmit the hold signal upon receiving either a float ("FLOAT") or lock ("LOCK") signal, respectively indicating that the work implement is operating in a float or locked mode, as is known to those skilled in the art. In addition, the integrator hold 38 may transmit the hold signal HOLD upon receiving a flag signal LIMIT2 from a max height limiter 42, discussed below. Each of these signals may be transmitted by ways known to those skilled in the art. In other embodiments of the invention, the integrator reset 36 and/or the integrator hold 38 may be omitted.

In appropriate embodiments, such as when the deadband filter 26 or the second signal multiplier 24 are omitted, the controller 28 may be directly coupled with either the second signal multiplier 24 or the third summer 22.

A maximum height determiner 40 receives the slip sensitivity signal SENS. The maximum height determiner 40 transmits a max height signal MAX as a function of the slip sensitivity signal SENS and a predetermined map. The predetermined map may be any of a variety of appropriate maps, including linear and nonlinear maps.

The maximum height limiter 42 is coupled with the maximum height determiner 40 to receive the max height signal MAX, and with the controller 28 to receive the control signal CONTROL. The maximum height limiter 42 limits the control signal CONTROL to a predetermined magnitude corresponding to the max height signal MAX. Typically the maximum height limiter 42 will transmit the control signal CONTROL as is when the control signal CONTROL is less than a predetermined value, and will limit the control signal CONTROL to the predetermined value when the control signal CONTROL exceeds the predetermined value. This prevents the hitch from being raised above a certain level. The maximum height limiter 42 also transmits the flag signal LIMIT2 to the integrator hold 38 when the control signal CONTROL reaches the predetermined value.

The various components of the slip control system 10 may be implemented in hardware or software, or some mixture of the two by ways known to those skilled in the art.

Figure 2:
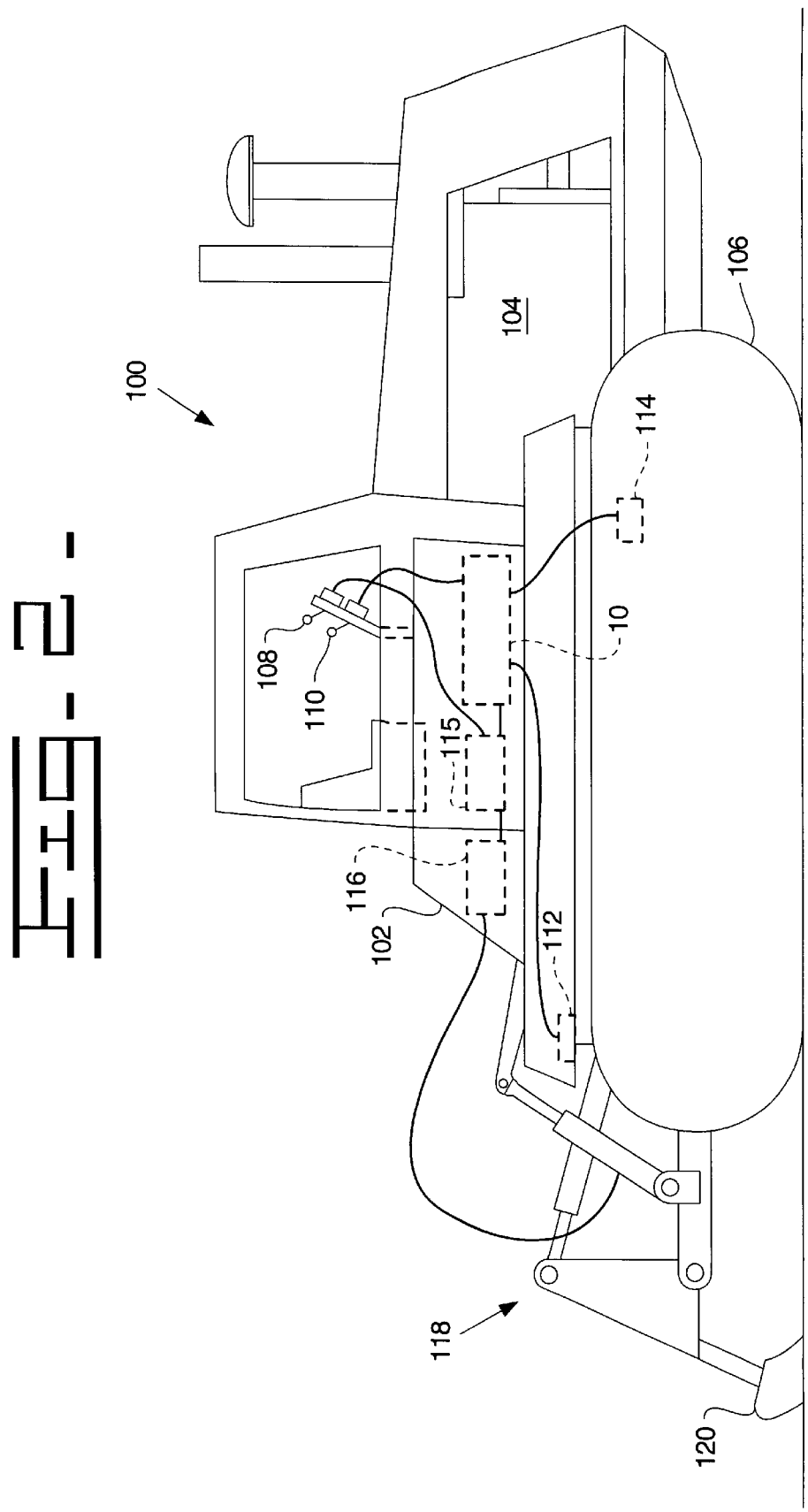
FIG. 2 is a side view and functional block diagram of a work machine according to one embodiment of the invention.

FIG. 2 is a side view and functional block diagram of a work machine 100 according to one embodiment of the invention. Although the work machine 100 is depicted as a track type tractor, other mobile work machines known to those skilled in the art may also be used, such as wheeled tractors, or loaders, for example.

The work machine 100 includes a frame 102 and a motor, such as an engine 104, coupled with a frame 102. The engine 104 produces a locomotive force by ways known to those skilled in the art. At least one ground engaging traction device, such as a track 106 or wheel (not shown), is coupled with the engine 104 to receive the locomotive force. The track 106 moves relative to the frame 102 as a function of the locomotive force by ways known to those skilled in the art. An input device, such as the hitch-position lever 108, is coupled with a frame 102, and provides a desired control position signal. A desired slip transmitter, such as a slip sensitivity lever 110, is coupled with the frame 102 and provides the slip sensitivity signal SENS described above.

A first sensor, such the ground speed sensor 112 is coupled with the frame 102 and transmits the actual velocity signal $VEL_{act}$ as a function of the velocity, e.g., true or ground speed, of the work machine 100. A second sensor, such as track speed sensor 114, is coupled with the track 106 and transmits the apparent velocity signal $VEL_{app}$ by any of a variety of appropriate ways known to those skilled in the art.

The slip control system 10 is coupled with the frame 102, the slip sensitivity lever 110, the ground speed sensor 112, and the track speed sensor 114, and functions similarly to what is described above. In one embodiment, the control signal CONTROL from the slip control system 10 corresponds to a delta position for the hitch. The various flag signals received by the integrator reset 36 and the integrator hold 38 may be transmitted by appropriate operator input devices, such as the hitch position lever 108, or by an appropriate processing device, such as a hitch position control system 115, discussed below.

A second control system, such as the hitch position control system 115 is coupled with the slip control system 10 to receive the control signal CONTROL. The hitch position control system 115 is also coupled with the hitch position lever 108 to receive the desired control position signal. The hitch position control system 115 transmits a second control signal CONTROL2 as a function of the control signal CONTROL from the slip control system and the desired control position signal.

In one embodiment, the hitch position control system 115 controls the position of a hitch 118 to a position corresponding to the position of the hitch control lever 108 plus or minus the delta position from the slip control system 10, although other relationships may also be used. The hitch position control system 115 may also control the mode of operation for the hitch 118, e.g., out of synch, float, or locked, and generate the appropriate flag signals accordingly.

In one embodiment of the invention, the slip control system 10 may be integrated into the hitch position control system 115. Alternately, portions of one system 10, 115 may be integrated into the other.

An actuating system, such as hydraulic pump system 116 is coupled with the second control system 115 to receive the second control signal CONTROL2. Other types of actuating systems, such as electric motors, for example, may also be used. The hydraulic pump system 116 raises, lowers, or maintains the position of the hitch 118 as a function of the control signal CONTROL by ways known to those skilled in the art.

Although a rear mounted hitch 118 is shown in FIG. 2, other types of equivalent coupling devices may also be used. For example, a front mounted hitch, or a draw bar (typically fixed or otherwise rigidly coupled to the frame 102) in combination with a moveable, controllable work implement known to those skilled in the art, could be used.

A blade, a cultivator, a plow 120 or other ground-engaging implement, such as tillage equipment, known to those skilled in the art may be coupled with the hitch 118.

In operation, an operator sets a desired position for the hitch 118 via the hitch position lever 108 and sets a desired slip sensitivity via the slip sensitivity lever 110. The ground speed sensor 112 and track speed sensor 114 respectively provide the actual velocity signal $VEL_{act}$ and the apparent velocity signal $VEL_{app}$ to the slip control system 10. The slip control system 10 then sends the control signal CONTROL to the hydraulic pump system 116, which raises the hitch if the actual slip is greater than the desired slip, and lowers the hitch if the actual slip is less than the desired slip.

Controlling the slip in this fashion may cause the hitch 118 to raise or lower above/below the desired position set by the hitch position lever 108. The operator determines this amount of "play" by the setting on the slip sensitivity lever 110. Generally, the greater the slip sensitivity setting, the greater the deviation can be from the commanded position from the hitch position lever 108.

In one embodiment, the hitch control system 115 may be omitted, and the control signal CONTROL from the slip control system 10 may be used to directly control the position of the hitch 108. From the foregoing it will be appreciated that, although specific embodiments of the invention have been described herein for purposes of illustration, various modifications may be made without deviating from the spirit or scope of the invention. Accordingly, the invention is not limited except as by the appended claims.

What is claimed is:

1. An apparatus for controlling slip of a work machine having a ground-engaging traction device and a hitch operable to receive a ground-engaging implement, comprising:
   a first sensor operable to transmit an actual velocity signal as a function of a velocity of the work machine;
   a second sensor operable to transmit an apparent velocity signal as a function of a velocity of the ground-engaging traction device;
   a desired slip transmitter operable to transmit a desired slip signal as a function of a desired slip of the work machine; and
   a control system coupled with the first and second sensors to receive the actual velocity signal and the apparent velocity signal, and coupled with the desired slip transmitter to receive the desired slip signal, the control system operable to determine an actual derivative of slip of the work machine as a function of the actual velocity signal and the apparent velocity signal, and further operable to transmit a control signal as a function of the desired slip signal, the actual velocity signal, the apparent velocity signal, and the actual derivative of slip, the control system operable to control the position of at least one of the hitch and the ground-engaging implement.

2. The apparatus of claim 1 further comprising the ground-engaging implement coupled with the hitch.

3. The apparatus of claim 1 wherein the velocity of the ground-engaging traction device is a function of a rotational velocity of the ground-engaging traction device and a diameter of a driving member of the ground-engaging traction device.

4. The apparatus of claim 1 wherein the desired slip transmitter is operable to transmit the desired slip signal to the control system as a function of an operator input.

5. The apparatus of claim 1 wherein the control signal is operable to raise and lower at least one of the hitch and the ground-engaging implement.

6. The apparatus of claim 1 wherein the control system comprises:
   a first summer coupled with the first and second sensors to receive the actual and apparent velocity signals, the first summer operable to transmit an actual slip signal as a function of the difference between the actual and apparent velocity signals;
   a second summer coupled with the desired slip transmitter to receive the desired slip signal and coupled with the first summer to receive the actual slip signal, the second summer operable to transmit a slip error signal as a function of the difference between the desired slip signal and the actual slip signal;
   differentiator coupled with the first summer to receive the actual slip signal, the differentiator operable to transmit an actual derivative slip signal as a function of the actual slip signal;
   a third summer coupled with the second summer and the differentiator to receive the slip error signal and the actual derivative slip signal, the third summer operable to transmit a derivative slip error signal as a function of the slip error signal and the derivative slip signal; and
   a controller coupled with the third summer to receive the derivative slip error signal, the controller operable to transmit the control signal as a function of the derivative slip error signal.

7. The apparatus of claim 6 wherein the controller comprises a proportional plus integral controller.

8. The apparatus of claim 6, further comprising a signal multiplier disposed between the second summer and the third summer, the signal multiplier operable to receive the slip error signal from the second summer, to multiply the slip error signal by a predetermined gain, and to transmit the multiplied slip error signal to the third summer.

9. An apparatus for controlling slip of a work machine having a ground-engaging traction device and a hitch operable to receive a ground-engaging implement, comprising a controller operable to receive an actual velocity signal indicative of an actual velocity of the work machine, an apparent velocity signal indicative of an apparent velocity of the work machine, and a desired slip signal indicative of a desired slip of the work machine, the controller operable to determine an actual derivative of slip of the work machine as a function of the actual velocity signal and the apparent velocity signal, and further operable to transmit a control signal as a function of the desired slip signal, the actual velocity signal, the apparent velocity signal, and the actual derivative of slip, the control signal operable to control the vertical position of one of the hitch and the ground-engaging implement.

10. A work machine, comprising:
   a frame;
   a moveable hitch coupled with the frame;
   a motor coupled with the frame and operable to exert a locomotive force;
   a ground-engaging traction device coupled with the frame and coupled with the motor to receive the locomotive force, the ground-engaging traction device operable to propel the work machine as a function of the locomotive force;
   a first sensor coupled with the frame, the first sensor operable to transmit an actual velocity signal as a function of a velocity of the work machine;
   a second sensor coupled with the ground-engaging traction device, the second sensor operable to transmit an apparent velocity signal as a function of a velocity of the ground-engaging traction device;
   a hitch height input coupled with the frame, the hitch height input operable to transmit a desired hitch height signal as a function of an operator input;
   a desired slip transmitter coupled with the frame and operable to transmit a desired slip signal as a function of an operator input;

a first control system coupled with the first and second sensors to receive the actual velocity signal and the apparent velocity signal, and coupled with the desired slip transmitter to receive the desired slip signal, the controller operable to determine an actual derivative of slip of the work machine as a function of the actual velocity signal and the apparent velocity signal, and further operable to transmit a control signal as a function of the desired slip signal, the actual velocity signal, the apparent velocity signal, and the actual derivative of the slip;

a second control system coupled with the hitch height input to receive the desired hitch height signal and coupled with the first control system to receive the control signal, the second control system operable to transmit a second control signal as a function of the desired hitch height signal and the first control signal; and an actuator coupled with the hitch and coupled with the second control system to receive the second control signal, the actuator operable to control the vertical position of the hitch as a function of the second control signal.

11. The work machine of claim 10 further comprising a ground-engaging work implement coupled with the hitch.

12. A method for controlling slip of a work machine having a hitch operable to receive a ground-engaging implement, comprising:

determining a desired slip of the work machine;

determining an actual slip of the work machine;

determining a derivative of the actual slip of the work machine; and controlling the position of one of the hitch and the ground-engaging implement as a function of the desired slip, the actual slip, and the derivative of the actual slip of the work machine.

13. The method of claim 12 wherein the derivative of the slip comprises the rate of change of slip over a predetermined amount of time.

14. The method of claim 12 wherein the work machine includes a ground-engaging traction device, and determining the actual slip comprises:

determining a velocity of the work machine;

determining a velocity of the ground-engaging traction device; and determining the actual slip as a function of the velocity of the work machine and the velocity of the ground-engaging traction device.

15. The method of claim 12 wherein controlling the position of the hitch comprises raising and lowering the hitch.

* * * * *